United States Patent
Finkenzeller et al.

(10) Patent No.: US 10,479,181 B2
(45) Date of Patent: Nov. 19, 2019

(54) CONNECTING CLUTCH FOR A HYBRID DRIVE TRAIN HAVING A TORQUE SENSOR

(71) Applicant: Schaeffler Technologies AG & Co. KG, Herzogenaurach (DE)

(72) Inventors: Marc Finkenzeller, Gengenbach (DE); Daniel Helmer, Ottenhofen (DE); Tim Schmid, Malsch (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 53 days.

(21) Appl. No.: 15/512,738

(22) PCT Filed: Aug. 26, 2015

(86) PCT No.: PCT/DE2015/200443
§ 371 (c)(1),
(2) Date: Mar. 20, 2017

(87) PCT Pub. No.: WO2016/045672
PCT Pub. Date: Mar. 31, 2016

(65) Prior Publication Data
US 2017/0297423 A1    Oct. 19, 2017

(30) Foreign Application Priority Data

Sep. 25, 2014 (DE) .................. 10 2014 219 479
Nov. 19, 2014 (DE) .................. 10 2014 223 590

(51) Int. Cl.
*B60K 6/365* (2007.10)
*F16F 15/134* (2006.01)
(Continued)

(52) U.S. Cl.
CPC .............. *B60K 6/387* (2013.01); *B60K 6/365* (2013.01); *B60K 6/48* (2013.01); *F16D 13/52* (2013.01);
(Continued)

(58) Field of Classification Search
CPC ....... B60K 6/387; B60K 6/365; Y10S 903/91; Y10S 903/914; B60Y 2400/73;
(Continued)

(56) References Cited

U.S. PATENT DOCUMENTS 5,503,602 A * 4/1996 Dick .................. B60K 17/3462
192/35
5,634,851 A    6/1997 Albers et al.
(Continued)

FOREIGN PATENT DOCUMENTS

DE    102012222110    6/2013
DE    102013210451    12/2013
(Continued)

*Primary Examiner* — Jacob S. Scott
*Assistant Examiner* — Lillian T Nguyen
(74) *Attorney, Agent, or Firm* — Volpe and Koenig, P.C.

(57) ABSTRACT

A hybrid drive train of a motor vehicle is discloses that has a first connecting component, which can be connected to an output shaft of an internal combustion engine, and a second connecting component, which can be connected to a shaft of a transmission and/or a rotor of an electric drive machine. The connection transmits torque when the clutch is in a closed position and is arranged to interrupt torque flow in an open position. A clutch actuation system switches the clutch between the two positions and has a ramp mechanism operatively connected to the components by a planetary gearing. The first component has two conducting segments connected in a rotationally fixed manner by a torque storage device, designed so the segments are elastically preloaded in a direction of rotation in relation to each other at least in the closed position.

6 Claims, 3 Drawing Sheets

(51) Int. Cl.
*F16D 27/14* (2006.01)
*B60K 6/387* (2007.10)
*F16D 13/52* (2006.01)
*B60K 6/48* (2007.10)
*F16D 13/58* (2006.01)
*F16D 23/12* (2006.01)

(52) U.S. Cl.
CPC ............ *F16D 13/58* (2013.01); *F16D 23/12* (2013.01); *B60K 2006/4825* (2013.01); *B60Y 2200/92* (2013.01); *B60Y 2400/414* (2013.01); *B60Y 2400/424* (2013.01); *B60Y 2400/73* (2013.01); *F16D 2023/123* (2013.01); *Y02T 10/6221* (2013.01); *Y02T 10/6252* (2013.01); *Y10S 903/91* (2013.01); *Y10S 903/914* (2013.01)

(58) Field of Classification Search
CPC ........ B60Y 2400/424; B60Y 2400/414; B60Y 2200/09; F16D 2027/007; F16D 27/115; F16D 28/00; F16D 2023/123; F16D 13/58; F16D 13/52; F16D 23/12; F16D 27/08; F16D 27/06; F16F 15/1337; F16F 15/1331

See application file for complete search history.

(56) References Cited

U.S. PATENT DOCUMENTS

| | | | |
|---|---|---|---|
| 9,180,866 B2 | 11/2015 | Helmer et al. | |
| 2004/0118653 A1* | 6/2004 | Ochiai | F16D 27/115 192/35 |
| 2014/0315682 A1* | 10/2014 | Helmer | B60K 6/387 477/5 |
| 2015/0122606 A1* | 5/2015 | Vogel | F16D 23/12 192/20 |
| 2015/0122607 A1* | 5/2015 | Vogel | H02K 49/046 192/35 |

FOREIGN PATENT DOCUMENTS

| | | |
|---|---|---|
| DE | 102013216268 | 4/2014 |
| DE | 102014205840 | 10/2014 |
| WO | 2013087055 | 6/2013 |

* cited by examiner

CONNECTING CLUTCH FOR A HYBRID DRIVE TRAIN HAVING A TORQUE SENSOR

BACKGROUND

The invention relates to a clutch (also called connecting clutch or E-clutch) for a hybrid drive train of a motor vehicle, such as a car, truck, bus, or an agricultural utility vehicle, comprising a first connection part, that can be connected in a rotationally fixed fashion to an output shaft/crankshaft of an internal combustion engine, such as a gasoline or diesel motor, and a second connection part, that can be connected in a rotationally fixed fashion to a shaft (transmission input shaft) of a transmission and/or a rotor (preferably in the form of a rotor shaft) of an electric drive engine, which connection parts in the closed state of the clutch are connected to each other in a torque-transmitting fashion, while in the open state of the clutch they are arranged in reference to each other such that they interrupt the flow of torque (i.e. arranged such that no torque is transmitted), and comprise a clutch actuating system, having a ramp mechanism and switching the clutch between the open and the closed position, with the ramp mechanism being effectively connected via a planetary gearing to the connection parts.

The invention therefore relates to a hybrid clutch/clutch for a hybrid drive train, comprising a shaft which cooperates with an electric drive engine depending on the intended type of drive and which is driven thereby and is connected to an internal combustion engine either simultaneously or at a different point of time, and is driven thereby.

A generic device of prior art is known from DE 10 2012 222 110 A1, comprising a clutch device with an actuating device for a drive train of a motor vehicle. In this context the drive train comprises an internal combustion engine and an electric machine with a stator and a rotor as well as a transmission device, with the clutch device being arranged in the drive train between the internal combustion engine on the one side and the electric machine and the transmission device on the other side. The clutch device and the actuating device are integrated in the rotor of the electric machine.

With these embodiments known from prior art it has shown, however, that the individual connection parts as well as the ramp mechanism acting upon them can be stressed in reference to each other during the closing process of the clutch under certain circumstances such that the clutch can only be opened with a torque that exceeds the torque previously used to close the clutch. In these cases the clutch initially closes by the torque issued by the output shaft of the internal combustion engine and is stressed thereby. Based on the given elasticity in the system, particularly in the ramp system of the clutch actuating system and the friction linings of the clutch, the stressing force is relatively strong. If then the torque at the output is reduced again with the clutch being closed and/or even an inversion of the direction of torque/inversion of the direction of momentum is affected (e.g., in case of change from tension to pressure) the clutch remains in its stressed condition until the torque in the inverse direction exceeds the torque with which the clutch had been closed before. Thus, for opening such clutches of prior art usually relatively strong opening torque needs to be applied, disadvantageously influencing the effectiveness of the clutch system.

SUMMARY

The objective of the present invention is therefore to correct these disadvantages known from prior art and to provide a clutch for a hybrid drive train, in which particularly the clutch actuation shall occur in an easier fashion, i.e. shall be implemented with improved effectiveness.

This is attained according to the invention in that the first connection part comprises two guiding sections, connected in a rotationally fixed fashion via a torque storage device, with the torque storage device being embodied such that the guiding sections are spring-elastically pre-stressed in the closed state in reference to each other in one direction of rotation (of the first connection part).

This causes that via the torque storage device a type of "torque sensor" is used, which acts as a cushion in the direction of torsion/direction of rotation between the connection to the internal combustion engine/the combustor and the section of the first internal connection part embodied frequently as an internal disk cage. This torque sensor temporarily stores the torque introduced when the clutch is closed and allows that the clutch in the closed state abstains from jamming. In particular during the process in which the play of the axial air gap is overcome between the parts of the clutch, the situation starts in which the clutch parts are jammed, for example a disk pack. In order to further close the clutch in this context, the compression force is generated such that the relative rotation of the guiding sections is still possible, though. This way any jamming of the individual clutch parts as well as the clutch actuation system is avoided during operation and the risk of any jamming is at least considerably reduced.

Other advantageous embodiments are claimed in the dependent claims and explained in greater detail in the following.

It is also advantageous for the torque storage device to comprise a mechanical spring unit. This way the torque storage device can be produced in a particularly simple fashion and more cost-effectively, namely using simple parts already produced in bulk. In this context it is additionally advantageous if the spring unit is elastically engaging in the (first) direction of rotation by a relative rotation when driving a first guiding section in reference to a second guiding section, which is spring-elastically pre-stressed in reference to the second guiding section and acts resiliently therein.

It is furthermore advantageous for the mechanical spring unit to comprise several mechanical spring elements, which cooperate such that they elastically and successively extend and rebound in both directions over an angular range of rotation. In particular in case of a relative movement/rotation of the first guiding section in reference to the second guiding section in the first direction of rotation these mechanical spring elements cooperate mechanically such that they successively and elastically engage/elastically pre-stress in this direction of rotation over the angular range of rotation. This way a spring element is implemented, with its spring force characteristic in reference to the angle of rotation being embodied individually, depending on the design of the individual spring elements, and allowing to be adjusted individually to the features of the respective clutch design.

When advantageously a first spring element is embodied as a pressure spring, preferably a coil spring or a bow spring, and/or a second spring element is embodied as a leaf spring or a leaf spring package, a spring unit is implemented allowing for its force to be adjusted with regards to the characteristic to the respective clutch in a particularly skillful fashion.

Additionally it is beneficial for the torque storage device to be embodied such that, at least in a first range of angles of rotation, upon a relative rotation of the first guiding section in reference to the second guiding section it comprises in the (first) direction of rotation lower spring hardness than a resulting elastic lining of the clutch. This way it is avoided in a particularly effective fashion that the spring unit itself is unintentionally stressed. The resulting elastic lining of the clutch is here a comprehensive elasticity of the clutch combining the elasticities of the individual clutch parts, particularly the friction linings.

Further preferred, a first/the first guiding section is embodied as a connecting flange component for the direct connection to an output shaft of the internal combustion engine or for the connection to a two-weight flywheel. This way the first guiding section can be arranged in a particularly skillful fashion.

It is also beneficial when a second/the second guiding section is embodied as a first clutch part, at least comprising a first friction lining. Further preferred, this second guiding section is then embodied as a disk pack, comprising several friction disks, each showing at least one first friction lining. This way the output shaft can be connected to the clutch as directly as possible.

Furthermore it is advantageous in this context when the second connection part is embodied as a second clutch part, comprising at least a second friction lining. This way the connection between the clutch and the shaft, for example the transmission input shaft, is embodied in a particularly direct fashion.

In this context it is further advantageous when the clutch is embodied as a friction clutch/friction coupling, because in such friction clutches the torque storage device used shows a particularly high effectiveness.

Furthermore, it is also advantageous for the clutch actuating system to be switchable via an eddy-current brake acting upon the planetary gearing. In particular when starting the internal combustion engine here a direct coupling to the internal combustion engine is implemented.

It is further advantageous for the torque storage device to be embodied such that it determines a torque that can be transmitted, introduced by the internal combustion engine and/or the clutch/multiple-disk clutch. This way the clutch is embodied with even greater efficiency.

In other words, here a clutch is claimed for a hybrid drive train, with the connecting clutch preferably being integrated in a rotor of an electric engine of the drive train or at least effectively connected thereto. The connecting clutch is embodied to couple and/or decouple an internal combustion engine/an internal combustion motor to/from the drive train, namely the shaft/transmission input shaft. In a clearly electromotive drive the connecting clutch is open/opened and is therefore in the open position so that the internal combustion engine is decoupled from the drive train. When a higher power is required or the electric energy storage is fading, the internal combustion engine is started by a partial closing of the connecting clutch, with here the connecting clutch switching into the driving operation. For this purpose preferably an electric brake in the form of an eddy-current brake is closed so that within the connecting clutch a difference in torque develops between a ramp ((second) ramp at the second ramp ring) at the disk side of the ramp device and a ramp at the annulus side ((first) ramp at the first ramp ring) of the ramp device, by which a planetary gearing (increase of input force) of the ramp system is rotated, causing the (dry) multiple-disk clutch of the connecting clutch to be partially engaged. Here the internal combustion engine is started by the electric motor. When the internal combustion engine finally rotates faster than the electric motor (traction mode), preferably a freewheel closes, causing the connecting clutch to engage completely. When the freewheel closes in traction mode, the internal combustion engine transfers a portion of its torque via an additional sun gear of the planetary gearing, connected to the freewheel, as well as the planets and the annulus to the ramp at the annulus side such that the connecting clutch is completely engaged and then the entire torque of the internal combustion engine is transmitted in the traction mode. Furthermore, the planetary drive is embodied as a two-stage planetary gearing, which is supported in the middle at the brace side, with here the large gears of the planets combing the sun of the electric brake at one side of the bearing, and the small gears of the planets comb the annulus (and the additional sun gear connected to the freewheel) at the other side of the bearing, which is connected in a rotationally fixed fashion to the annulus and/or the ramp ring (first ramp ring) at the side of the brace. The focal point of each planet is located inside the bearing of the planet at the side of the brace, respective overturning is compensated under load and/or supported by the sun on one side of the bearing at the side of the brace and the additional sun gear connected to the freewheel at the other side of the bearing at the side of the brace. According to the invention a torque sensor is provided, which is embodied to determine torque that can be introduced from the internal combustion engine and/or transmitted by the multiple-disk clutch. As soon as the internal combustion engine rotates faster than the electric machine and/or the transmission input shaft the multiple-disk clutch closes automatically (and energy-free, i.e. without the eddy-current brake being electrified) via the freewheel. This freewheel uses a portion of the torque to be transmitted and also actuates the ball-ramp system via the planetary gearing, causing the multiple-disk clutch to be closed. The brake moment that can be generated by the eddy-current brake is variable, preferably depending on the torque determined by the torque sensor. This way a relative rotation is possible between the connecting control element, such as a freewheel, and the main clutch. When using a freewheel device/a freewheel between a drive wheel of the planetary gear and the first guide section, the torque sensor acts then preferably between the connection to the combustor (the internal combustion engine) and thus also between the freewheel and the internal disk pack.

BRIEF DESCRIPTION OF THE DRAWINGS

The invention is now explained in greater detail based on the figures, in which the figures show different embodiments.

Shown are.

DETAILED DESCRIPTION OF THE PREFERRED EMBODIMENTS

Figure 1:
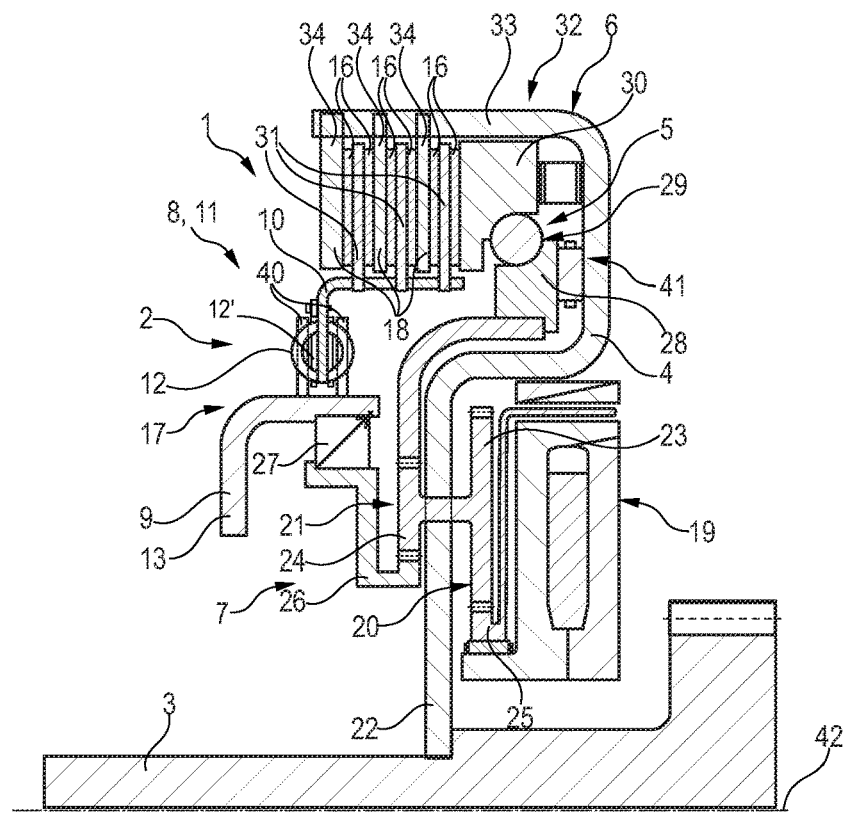
FIG. 1 a longitudinal section through a clutch according to the invention based on a first embodiment, with the sectional level extending along the axis of rotation of the clutch and, among other things, a pressure spring of the torque storage device being clearly discernible, FIG. 2 an angle of rotation—torque diagram concerning the clutch of the first embodiment, in which an angle of rotation—torque progression of the torque storage device is shown in reference to an elastic lining, FIG. 3 a longitudinal section of the clutch according to the invention based on a second embodiment, which clutch is sectioned along the axis of rotation of the clutch, with however the planetary gearing being designed slightly differently and the two planetary gear sets not being axially offset as in the first embodiment, but here arranged radially outside the inserted eddy-current brake, FIG. 4 a longitudinal section of the clutch according to the invention based on a third embodiment, which in turn is sectioned along the axis of rotation of the clutch, with here however the first guiding section not being connected via the torque storage device to the second guiding section like before radially inside the friction linings, but this connection site now being arranged radially outside, and FIG. 5 once more a longitudinal section is shown of the clutch of the third embodiment, in which the clutch is shown in an assembled state, with the first guiding section being connected in a rotationally fixed fashion to a two-weight flywheel and this flywheel in turn being connected to an output shaft of the internal combustion engine and where it being discernible how the eddy-current brake is arranged at a rear wall of the transmission.

The figures only show a schematic illustration and serve exclusively to understand the invention. Identical elements are marked with the same reference characters. The different features of the various embodiments can be freely combined with each other.

FIG. 1 initially shows a first exemplary embodiment of a clutch 1 according to the invention in a particularly clear fashion. The clutch 1 is in this embodiment again a clutch 1 of a hybrid drive train of a motor vehicle. Furthermore, the clutch 1 is embodied as a friction clutch, namely a dry-running friction clutch, which is embodied by design in the form of a multiple-disk clutch. The clutch 1 comprises first a connection part 2, connected in a rotationally fixed fashion to an output shaft 15, which is discernible from the following discussion of FIG. 5 that can be connected to an internal combustion engine and in the operating state of the clutch 1 this engine can also be connected to this output shaft 15. In addition to this first connection part 2, which is embodied in several parts as explained in greater detail in the following, the clutch 1 comprises a second connection part 4 that can be connected in a rotationally fixed fashion to a shaft 3, namely a transmission input shaft of a transmission, and in the operating state is actually connected in a rotationally fixed fashion to this shaft 3. In the operating state the shaft 3 furthermore also cooperates with a rotor of an electric drive machine, namely connected thereto in a rotationally fixed fashion, for reasons of clarity not shown here in greater detail, which electric machine is also called electric motor. The shaft 3 is therefore also called rotor shaft.

In a closed position the two connection parts 2 and 4 are connected to each other in a torque-transmitting fashion, while in an open position of the clutch 1 they are arranged interrupting the flow of torque, and thus no torque is transmitted between them. In order to actuate the clutch 1, namely for engaging or disengaging the clutch 1 into the opened or closed position, the clutch 1 comprises further a clutch actuating system 6, which comprises/includes a ramp mechanism 5. The ramp mechanism 5 in turn engages or disengages the clutch 1, depending on its setting, and this way brings it into a closed position or an opened position. The clutch actuating system 6 is effectively connected via a planetary gearing 7 to the two connection parts 2 and 4, with depending on the rotary state of the first or second connection parts 2 and 4 in reference to each other the ramp mechanism 5 is moved via the planetary gearing 7 into the opened or closed position.

The clutch 1 of the type according to the invention is here essentially embodied and functions like the clutch device known from DE 10 2012 222 110 A1.

The planetary gearing 7 is embodied in two stages, and comprises two planetary wheel sets 20 and 21. As particularly clearly discernible from FIG. 1, the second connection part 4 is shaped essentially like a cup and connected at its radial interior to the shaft 3 in a rotationally fixed fashion. Radially outside this connection site to the shaft 3 the second connection part 4 essentially extends disk-shaped further outwardly in the radial direction. The two planetary wheel sets 20 and 21 are received at this disk-shaped section 22. The first planetary wheel set 20 comprises here several first planetary wheels 23, arranged along the perimeter of the second connection part 4, which are supported in reference to the second connection part 4 in an articulate/rotational fashion at the disk-shaped section 22.

Each first planetary wheel 23 of the first planetary wheel set 20 is connected in a rotationally fixed fashion to a second planetary wheel 24 of a second planetary wheel set 21. In this embodiment it is even embodied such that these two planetary wheels 23 and 24 are integral with each other. The second planetary wheels 24 are arranged distributed over the perimeter and connected according to FIG. 1 respectively always to a second planetary wheel 24 in a rotationally fixed fashion, namely integrally. The two (first and second) planetary wheels 23 and 24 are respectively connected to each other coaxially, supported rotationally about a common axial section. While the first planetary wheel 23 is arranged on a first axial side of the disk-shaped section 22, in the operating state facing away from the internal combustion engine, the second planetary wheel 24 is arranged on a second axial side of the disk-shaped section 22, which second axial side in turn facing the first planetary wheel 23 in the axial direction. Due to the fact that both the first as well as the second planetary wheel 23 and 24 are supported rotationally in reference to the second connection part 4 this second connection part 4 is also called planetary carrier.

The first planetary wheel 23, comprising a larger circular gear diameter than the second planetary wheel 24, further engages a gear cooperating with the eddy-current brake 19, said gear hereinafter being called the first sun gear 25 of the planetary gearing 7. The first sun gear 25 is here embodied such that it cooperates with a magnetic eddy current field generated by the eddy current brake 19, and can be braked thereby.

A second sun gear 26 of the planetary gearing 7 engages each second planetary wheel 24. This second sun gear 26 is connected/cooperating via a freewheel/a freewheel device 27 to the first connection part 2. In particular, the freewheel device 27 cooperates with a first guiding section 9 (also called connection flange part 13) of the first connection part 2 such that it acts in a blocking fashion during a movement/relative rotation of the first connection part 2 in reference to the second connection part 4 in a first direction of rotation so that the first connection part 2 and/or its first guiding section 9 is connected to the second sun gear 25 in a rotationally fixed fashion. This first direction of rotation shall be understood as a relative direction of rotation, which causes that the first connection part 2, namely the first guiding section 9, rotates faster in this first direction of rotation about the axis of rotation 42 than the second connection part 4. In an opened position/setting of the freewheel device 27, namely during movement/relative rotation of the first guiding section 9 in a second direction of rotation, opposite the first direction of rotation, with the speed of rotation of the second connection part 4 being faster than the one of the first connection part 2, the two components of the second sun gear 26 and the first guiding section 9 are not connected to each other in a rotationally fixed fashion but rotate freely in reference to each other, i.e. without transmitting any torque.

In addition to the second sun gear 26, the second planetary wheel 24 also engages a first ramp ring 28 embodied as an annulus. The first ramp ring 28 comprises at its radial interior circumference a gearing engaged by the gears of the second planetary wheel 24. The first ramp ring 28 of the ramp mechanism 5 cooperates via a ball drive 29 to a second ramp ring 30 of the ramp mechanism 5. The ball drive 29 is arranged and embodied such that during a rotation of the first ramp ring 28 the second ramp ring 30 is displaced in the axial direction. Along a ramp arranged at a first and/or second ramp ring 28, 30, which in a circumferential direction widens or tapers in its axial direction, here balls of the ball drive 29 roll during a relative rotation between the first and the second ramp ring 28, 30, causing the axial position of the second ramp ring 30 to be changed. The second ramp ring 30 cooperates in turn via a face with the friction linings 16, 18 of the clutch 1, and compresses them in a closed position of the clutch 1 in a friction-fitting fashion or is arranged in the opened position of the clutch 1 such that no torque is transmitted between the friction linings 16, 18, and the friction linings 16, 18 are therefore without any friction-fitting contact.

First friction linings 16 are here embodied by several friction disks 31. The friction disks 31 are connected via a second guiding section 10 of the first connection part 2 in a rotationally fixed fashion, however arranged displaceable in reference thereto in the axial direction. The friction disks 31 comprise a first friction lining 16 towards each axial side. The second guiding section 10 and thus also the first connection part 2 form therefore a kind of first clutch part 17.

The first clutch part 17 can be connected to the second clutch part 32 in a friction-fitting fashion. The second clutch part 32 is embodied in the form of the above-described second connection part 4. For this purpose, several pressure plates 34 are arranged and extending in the axial direction at a holding sections 33 of the second connection part 4 outside the disk-shaped section 22 seen in the radial direction. One of these pressure plates 34, namely the (first) pressure plate 34 in the axial direction most distanced from the second ramp ring 30, is here fixed, i.e. connected fixed in the axial direction to the holding section 33. A (second and third) pressure plate 34 each is arranged between respectively two adjacent friction disks 31. The friction disks 34 are in turn displaceable in the axial direction in reference to the friction disks 31. Each pressure plate 34 in turn forms a (second) friction lining 18 at its side cooperating with a first friction lining 16. First and second friction linings 16, 18 are then in turn connected to each other in a friction-fitting fashion in the closed state of the clutch 1.

In this embodiment the ramp mechanism 5, the planetary gearing 7, the freewheel 27, and the first connection part 2 cooperate such that upon rotation of the first guiding section 9 in reference to the second connection part 4 in the first direction of rotation of the ramp mechanism 5 the clutch 1 is moved into the closed state. This means that upon a rotation of the first connection part 2 faster than the second connection part 4 initially the freewheel 27 blocks and then the first guiding section 9 drives the second sun gear 26 in a rotating fashion. This second sun gear 26 in turn drives the second planetary wheel 24 and this one then in turn the first ramp ring 28 embodied as an annulus, which then also rotates with a speed depending on the transmission stages. The ramps of the first ramp rings 28 and 30 are adjusted to each other such that upon rotation of the first guiding section 9 in the first direction of rotation of the first ramp ring 28 an axial displacement of the second ramp ring 30 is caused with its face pointing in the direction of the friction disks 31 as well as the pressure plates 34. With an increasing torque the second ramp ring 30 causes an increasingly narrower and stronger compression/pushing together of the friction disks 31 and the pressure plates 34, so that they connect each other in a rotationally fixed fashion in the closed state of the clutch 1. In the closed state of the clutch 1 achieved in this fashion the first and the second connection parts 2, 4 are also connected to each other in a rotationally fixed fashion. This closed state is here converted to a status of the hybrid drive train, in which it is desired that the internal combustion engine transmits torque to the shaft 3.

According to the invention it is now implemented that the first connection part 2 is embodied in several parts such that a torque storage device 8 is arranged between the first guiding section 9 and the second guiding section 10, which connects the two guiding sections 9 and 10 to each other in a motion-coupled way, namely rotationally fixed, however simultaneously allows a relative movement between these guiding sections 9, 10. The torque storage device 8 is embodied such that the first guiding section 9 in the closed state of the clutch 1 is pre-stressed spring-elastically in the first direction of rotation/relative direction of rotation of the first connection part 2 in reference to the second guiding section 10. Any rotation of the first connection part 2 therefore leads to a rotation of the first guiding section 9 in the same direction and thus, due to the spring-elastic pre-stressing, to a relative rotation of the first guiding section 9 in reference to the second guiding section 10. When driving the first guiding section 9 in reference to the second connection part 4, this causes again a rotation of the first connection part 2 in its first relative direction of rotation. This way, a softness is introduced to the system, which avoids that the ramp mechanism 5 and/or the friction disks 31 and/or the pressure plates 34 jam during operation, namely in the closed state.

It is further discernible that the torque storage device 8 shows a mechanical spring unit 11, which is embodied such that during a rotation of the first guiding section 9 in reference to the second guiding section 10 it elastically engages in the first relative direction of rotation, and thus it is pre-stressed elastically. The mechanical spring unit 11 comprises several mechanical spring elements, with here particularly a first spring element 12 being shown. The spring elements of the spring unit 11 cooperate here such that they successively engage elastically over an angle of rotation, seen in the first relative direction of rotation. When consequently the clutch 1 is brought into the closed state, initially the first spring element 12 engages elastically, as particularly clearly discernible in connection with FIG. 2, then a second spring element, and following thereto in turn a third spring element.

The first spring element 12 is here embodied as a pressure spring in the form of a coil spring. The second spring element 12' and the third spring element are here again embodied as leaf springs. They may even be part of a common package of leaf springs or respectively embodied by a separate package of leaf springs.

Figure 2:
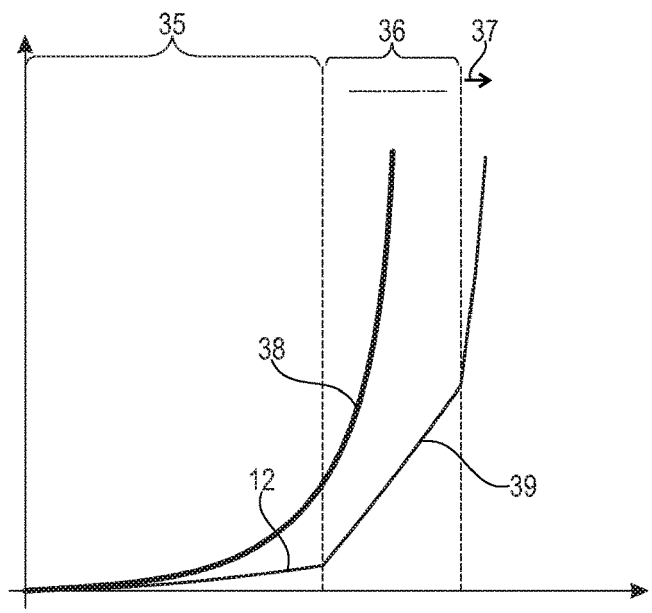

As particularly clearly discernible in connection with FIG. 2, the angle of rotation is marked in this diagram on the abscissa and the torque generated by the internal combustion engine and thus applied to the first guiding section 9 is marked on the ordinate. The flatter progressing curve of the two progressions of the torque of the angular rotation shown here indicates the progression of torque of the angular rotation of the spring unit 11 (hereinafter called progression of the spring unit 39). The slightly steeper progressing/faster increasing progression illustrates here the elasticity of the lining given in the clutch (progression of elasticity of the lining 38). The elasticity of the lining results here essentially from the elastic deformation within the individual clutch parts increasing with the rising compression force of the first ramp ring 28 and/or the second ramp ring 30. In particular, the individual friction linings 16 and 18 of the friction disks 31 and the pressure plates 34 show here a certain degree of elasticity in the axial direction, the entirety thereof being illustrated by this dot-dash line.

Furthermore, FIG. 2 shows in a particularly clear fashion that the spring unit 11 is embodied such that during a rotation of the first guiding section 9 in reference to the second guiding section 10 in the first relative direction of rotation the first spring element 12 is compressed over a first range of an angle of rotation 35. This first spring element 12 is here with regards to its spring hardness embodied lower than the elasticity of the lining so that the progression of the spring unit 39 extends flatter than the progression of the elasticity of the lining 38. After a complete compression of this first spring element 12 finally, during further rotation of the first guiding section 9 in reference to the second guiding section 10 in the first direction of rotation, a second spring element is compressed in a second range of the angle of rotation 36 following the first range of the angle of rotation 35. Here, the spring hardness of this second spring element embodied as a leaf spring is in turn weaker than the elasticity of the lining. After an elastic compression/deformation of this second spring element and upon another rotation of the first guiding section 9 in reference to the second guiding section 10 in the first relative direction of rotation then a third spring element engages, which in turn is embodied as a leaf spring. This third spring element, which is elastically deformed in a third angular range of rotation 37 following the second range of angular rotation 26 is here always flatter, i.e. is embodied with weaker elasticity than the elasticity of the lining. However the three spring elements are adjusted to each other such that the first spring element 12 in turn has a lower spring hardness than the second spring element and the second spring element shows a lower spring hardness than the third spring element.

At least the first spring element 12 is stressed between the first and the second guiding section 9, 10, with the first spring element 12 being received at the first guiding section 9 at radially projecting holding protrusions 40 and is supported there.

Figure 3:
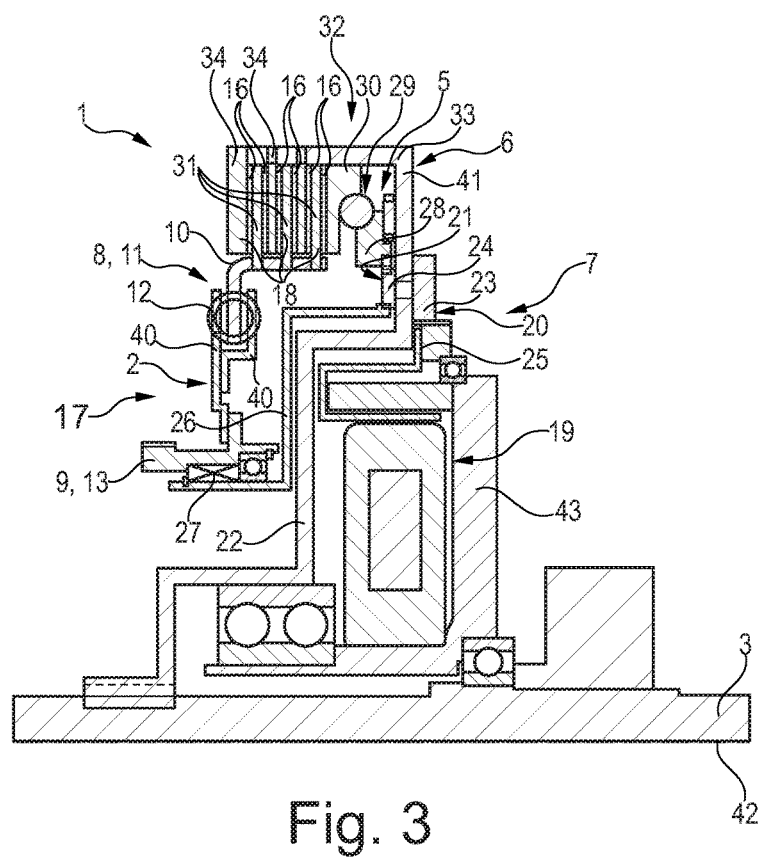

FIG. 3 then shows another embodiment of the clutch 1 according to the invention. This second embodiment is essentially acting and functioning and designed like the first embodiment, so that in the following only the differences in reference to the first embodiment are listed. As initially discernible with regards to the first connection part 2 the first guiding section 9 is embodied in a slightly different way. This first guiding section 9 is here embodied in several parts, with a sheath-like basic section showing a flange-like step connected to the two holding projections 40 accepting the spring unit 11. The two holding projections 40 for holding the spring elements, particularly the first spring element 12, are no longer connected integrally to the first guiding section 9, like in the first exemplary embodiment, but are comprised as separate parts at the base section, preferably assembled in a material-to-material or force-fitting fashion.

Furthermore, the planetary gearing 7 is designed slightly differently. The second planetary wheel 24 is now provided further offset towards the outside, and no longer arranged at the disk-shaped section 22, but at the base section 41 of the overall essentially cup-shaped second connection part 4, arranged offset in the axial direction in reference to this disk-shaped section 22. The second sun gear 26 extends now consequently no longer from the freewheel 27 in the radial direction inwardly, where it then combs the second planetary gear 24, but from the freewheel 27 outwardly in the radial direction.

Additionally, the connection from the second connection part 4 to the groove 3 is particularly clearly discernible in the form of a serration. The axis of rotation 42 of the clutch 1 is here also shown clearly in a dot-dash line.

Figure 4:
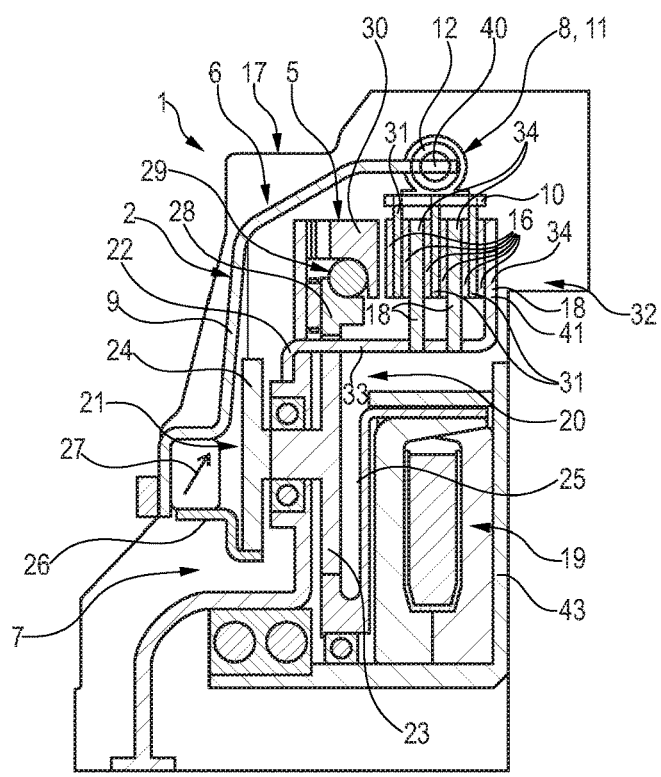

A third advantageous embodiment is then shown in FIGS. 4 and 5, with this embodiment also being designed similar to the first embodiment, and thus in the following only the differences being discussed. As again discernible in this context the first connection part 2 is designed slightly differently. This first connection part 2 comprises now a first guiding section 9, essentially embodied in a cup-shaped fashion, which extends in the radial direction from the freewheel 27 towards the outside, with the first guiding section 9 surrounding both the ramp mechanism 5 as well as the second connection part 4 radially from the outside. The second guiding section 10 is here essentially embodied as an annular holding element, however in turn via the torque storage device 8 connected in a rotationally fixed fashion to the first guiding section 9.

Figure 5:
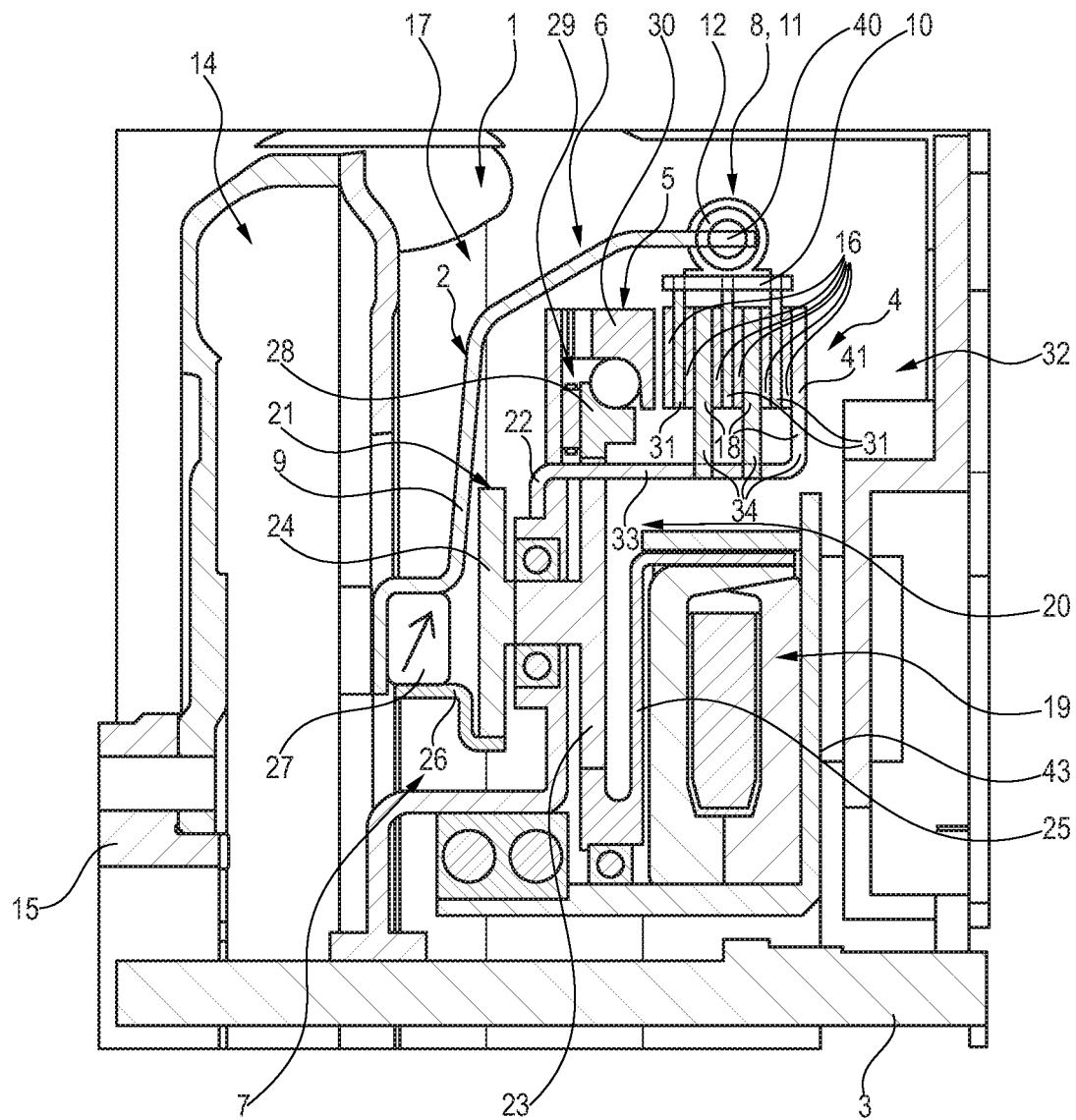

As then particularly clearly discernible in FIG. 5, this first guiding section 9 is connected in a rotationally fixed fashion to a driven wheel of the two-weight flywheel 14, which two-weight flywheel 14 comprises, in addition to this driven wheel, a drive wheel, which in turn is connected in a rotationally fixed fashion to the output shaft 15 of the internal combustion engine. Additionally, the eddy current brake 19 is connected to a rear wall of the transmission 43. In this third embodiment the planetary gearing 7 is also embodied differently than the one of the first embodiment, with particularly the first ramp ring 28 directly combing the first planetary wheel 23 of the first planetary wheel set 20, with the second planetary wheel 24 of the second planetary wheel set 21 only combing the second sun gear 26.

In other words, a connecting clutch/pilot clutch (clutch 1) is formed here, which is embodied particularly for a hybrid drive train and comprises an eddy-current brake 19 as well as a torque sensor (torque storage device 8). Both the friction disks 31 as well as the freewheel 18, acting as a pilot control element, are connected to the internal combustion motor/the internal combustion engine. As long as the E-machine rotates faster than the internal combustion engine the freewheel 27 is taken over (no transmission of torque). Once the speed of the internal combustion engine exceeds the one of the E-machine the freewheel 27 engages and a certain torque is transmitted. Here, this so-called pilot control torque is transmitted via the planetary stage (20, 21) and, due to the difference in the speed between the combustor and the E-machine, the freely rotational lower ramp (first ramp ring 28) is distorted. At this point of time, the primary clutch 1 is still open and no torque is transmitted by it. As soon as the upper, axially displaceable ramp (second ramp ring 30) has overcome the air gap play, it begins to clamp the disk pack 31. In order to further close the clutch 1, here a relative motion is implemented between the pilot control element and the main clutch via the torque sensor 8.

When designing the torque sensor 8 it must be observed that the characteristic of the torque sensor 8 is always flatter than the one of the lining. The first section of the characteristic of the torque sensor is implemented by pressure springs. Subsequently the torque is supported via leaf spring elements and a two-stage design is yielded by changed contacts. In order to transfer thrust (when starting the combustion engine or in an active motor brake) the coil of an eddy-current brake 19 is electrified such that a magnetic field develops. This field penetrates the disk (rotating with the E-machine and/or the transmission speed) and here induces eddy currents, forming a brake torque. This is increased via a planetary stage and transferred by the freely rotating ramp of a ball ramp system, in which the torque is converted into an axial compression. The rotor supporting the planets as well as the ball ramp system is connected to the E-machine and includes the inner cage including the steel disks. With the help of the compression the disk pack is clamped and this way the main clutch is closed for transmitting torque. The axially displaceable ramp is here connected via leaf springs to the rotor, which generate a return force and reset the ball ramp system 6 into its zero position when a pilot control torque is missing. The torque sensor 8 is installed between the outer cage 10 receiving the friction disks 31, preventing the ramp mechanism 5 from jamming. As soon as the burner rotates faster than the E-machine and/or the transmission input shaft the clutch 1 automatically (and without energy) closes via the freewheel 27. This uses a portion of the torque to be transmitted and also actuates via the planetary gear set/planetary set the ball ramp system 6, causing the main clutch to be closed. An actuation of the eddy-current brake 19 is therefore required only briefly for starting the burner or for using the combustor as a motor brake. The torque that can be transmitted here can be adjusted via the current flowing through the coil.

LIST OF REFERENCE CHARACTERS 1 clutch
2 first connection part
3 shaft
4 second connection part
5 ramp mechanism
6 clutch actuating system
7 planetary gearing
8 torque storage device
9 first guiding section
10 second guiding section
11 spring unit
12 spring element
13 connecting flange part
14 two-weight flywheel
15 output shaft
16 first friction lining
17 first clutch part
18 second friction lining
19 eddy-current brake
20 first planetary wheel set
21 second planetary wheel set
22 disk-shaped section
23 first planetary wheel
24 second planetary wheel
25 first sun gear
26 second sun gear
27 freewheel device
28 first ramp ring
29 ball drive
30 second ramp ring
31 friction disk
32 second clutch part
33 holding section
34 pressure plate
35 first range of angle of rotation
36 second range of angle of rotation
37 third range of angle of rotation
38 progression of elasticity of the lining
39 progression of spring unit
40 holding projection
41 base section
42 axis of rotation
43 rear wall of transmission

The invention claimed is:

1. A clutch for a hybrid drive train of a motor vehicle, comprising:
   a first connection part that is connectable in a rotationally fixed fashion to an output shaft of an internal combustion engine, and
   a second connection part that is connectable in a rotationally fixed fashion to a shaft of at least one of a transmission or a rotor of an electric drive engine,
   said first connection part and said second connection part are connected to each other in a closed position of the clutch in a torque transmitting manner, while in an opened position of the clutch the connection parts are arranged interrupting a flow of torque, and a clutch actuating system, comprising:
      a ramp mechanism switching the clutch between the opened and the closed position, with the ramp mechanism being effectively connected via planetary gearing to the connection parts,
   the first connection part comprises two guiding sections connected in a rotationally fixed fashion via a torque storage device, and
   the torque storage device is arranged such that the guiding sections at least in a closed position are spring-elastically pre-stressed in reference to each other in a direction of rotation,
   the torque storage device comprises a mechanical spring unit,
   the mechanical spring unit comprises several mechanical spring elements which cooperate such that the mechanical spring elements successively elastically engage or disengage over a range of an angle of rotation,
   a first one of the spring elements is a pressure spring, and
   a second one of the spring elements is a leaf spring or a leaf spring package.

2. The clutch according to claim 1, wherein a first one of the guiding sections is a connecting flange part for direct connection to the output shaft of the internal combustion engine or connection to a two-weight flywheel.

3. The clutch according to claim 2, wherein a second one of the guiding sections comprises at least a first friction lining.

4. The clutch according to claim 3, wherein the second connection part comprises at least a second friction lining.

5. The clutch according to claim 1, wherein the clutch is a friction clutch.

6. The clutch according to claim 1, wherein the clutch actuating system is switchable via an eddy-current brake acting upon the planetary gearing.

* * * * *